R. W. HUSTON.
Coal Hod.
No. 26,188.
Patented Nov. 22, 1859.
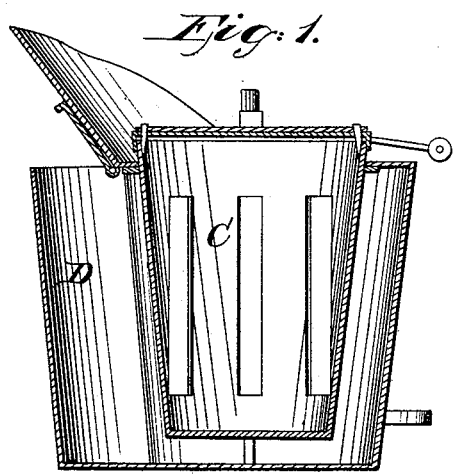
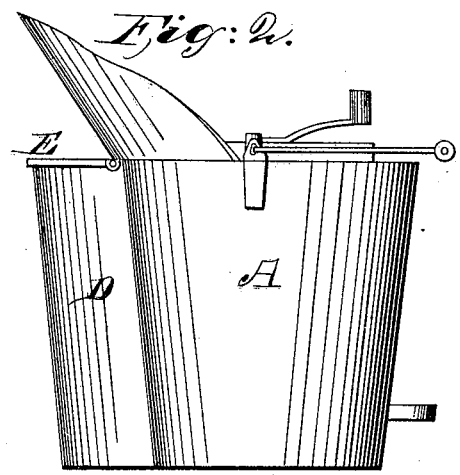
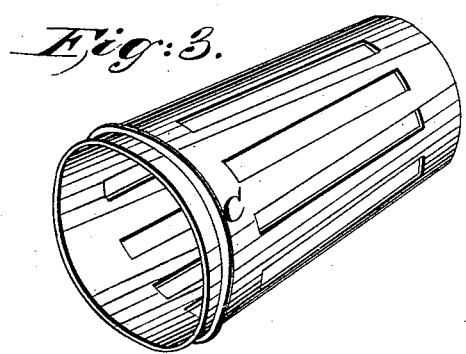
Witnesses:
A. A. Geatman
C. N. Alexander
Inventor:
R. W. Huston

UNITED STATES PATENT OFFICE.

R. W. HUSTON, OF CALAIS, MAINE.

COAL-HOD.

Specification of Letters Patent No. 26,188, dated November 22, 1859.

*To all whom it may concern:*

Be it known that I, R. W. HUSTON, of Calais, in the county of Washington and State of Maine, have invented certain new and useful Improvements in Coal-Hods, of which the following is a full, clear, and exact description, reference being had to the accompanying drawings, forming part of this specification, in which—

Figure 1 represents a sectional elevation of a coal hod embracing my improvements. Fig. 2 represents a side elevation of the outer casing of the same. Fig. 3 represents a perspective view of the interior coal bucket or basket.

The nature of my invention consists in the employment of an open coal bucket or basket arranged to revolve within an outer casing of larger dimensions than the coal bucket, which receives and retains the coal dust and litter sifted from the coal when the bucket is turned. The coal dust and litter is discharged from the casing through an opening or channel the cover of which opens immediately below or under the mouth with which the casing is provided for the discharge of coal from the bucket.

By reference to the accompanying drawings it will be seen that the coal bucket or basket (C) is elevated above and has its bearings in the bottom of the outer casing (A), and is provided near its top with an outer rim or flanch (c), which comes in contact with the under side of the cover or top of the casing which surrounds the coal bucket at this point and serves to guide and sustain it in a vertical position. The object of this rim or flanch is to confine the bucket securely within the casing and prevent it from being raised therefrom or disturbed in its position while being revolved or partially turned.

The coal bucket or basket (C) is provided with longitudinal slots or interstices in its sides which incline outward toward its top; and also with openings in its bottom for the escape of coal dust and litter from the bucket into the casing. A close fitting lid, provided with a suitable handle, covers the top of the bucket and is connected thereto by two small pins projecting above the rim of the bucket, which enter corresponding holes in the lid, so that the bucket is revolved by turning the handle attached to the lid or cover and the coal thus thoroughly sifted and left free of all litter.

The outer casing (A) is provided with a suitable opening or channel (D) for the discharge of coal dust and litter from the casing, and the mouth of this opening or channel is covered with a close hinged lid (E) which serves when closed to prevent the discharge of the litter contained in the casing, while the coal is being discharged from the bucket.

Having thus fully described my invention what I claim as new and desire to secure by Letters Patent is—

The arrangement of the bucket C, with the external casing A, when the bucket is provided with a rim or flanch, c, around its top, and with a pin on its bottom upon which it revolves, and when the external casing is provided with a top which fits snugly around the bucket, and over the rim or flanch, with a channel D, and with a door, to said channel, the whole being used substantially as and for the purpose specified.

R. W. HUSTON.

Witnesses:
I. S. BAILEY,
EDWARD A. BAILEY.